(12) United States Patent
Dasarakothapalli et al.

(10) Patent No.: US 10,374,809 B1
(45) Date of Patent: Aug. 6, 2019

(54) DIGITAL SIGNATURE VERIFICATION FOR ASYNCHRONOUS RESPONSES

(71) Applicant: Amazon Technologies, Inc., Seattle, WA (US)

(72) Inventors: Arjun Dasarakothapalli, Seattle, WA (US); Morgan Akers, Kirkland, WA (US); David Alan Blunt, Seattle, WA (US); Darin Keith McAdams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 15/377,895

(22) Filed: Dec. 13, 2016

(51) Int. Cl.
*H04L 9/08* (2006.01)
*H04L 9/32* (2006.01)
*H04L 9/30* (2006.01)

(52) U.S. Cl.
CPC .......... *H04L 9/3263* (2013.01); *H04L 9/0891* (2013.01); *H04L 9/30* (2013.01); *H04L 9/3247* (2013.01)

(58) Field of Classification Search
CPC ....... H04L 9/3263; H04L 9/30; H04L 9/3247; H04L 9/0891
See application file for complete search history.

(56) References Cited

U.S. PATENT DOCUMENTS

| | | | | |
|---|---|---|---|---|
| 8,893,293 B1* | 11/2014 | Schmoyer | ........... | H04L 63/0807 455/558 |
| 9,112,854 B1* | 8/2015 | Bhimanaik | ........... | H04L 63/126 |
| 9,369,445 B2* | 6/2016 | Mahajan | ............. | H04L 63/0428 |
| 9,613,221 B1* | 4/2017 | Reed | .................... | H04L 63/0823 |
| 9,614,683 B1* | 4/2017 | Reed | .................... | H04L 63/0823 |
| 9,680,872 B1* | 6/2017 | Roth | ........................ | H04L 63/20 |
| 9,781,098 B2* | 10/2017 | Mohamad Abdul | ...... | G06F 8/60 |
| 9,838,388 B2* | 12/2017 | Mather | ............... | H04L 63/0861 |
| 9,866,392 B1* | 1/2018 | Campagna | ............ | H04L 9/3247 |
| 2004/0243805 A1* | 12/2004 | Enokida | .............. | H04L 63/0823 713/175 |
| 2011/0213961 A1* | 9/2011 | Wnuk | .................... | H04L 63/062 713/156 |
| 2012/0174208 A1* | 7/2012 | Sperling | ............. | H04L 63/0823 726/10 |
| 2012/0204032 A1* | 8/2012 | Wilkins | .................. | H04L 9/006 713/170 |
| 2012/0226646 A1* | 9/2012 | Donoho | ............... | G06Q 10/101 706/46 |

(Continued)

OTHER PUBLICATIONS

Atkinson, R., "IP Authentication Header," Request for Comments: 1826, Standards Track, Aug. 1995, 14 pages.

(Continued)

*Primary Examiner* — Joseph P Hirl
*Assistant Examiner* — Stephen T Gundry
(74) *Attorney, Agent, or Firm* — Davis Wright Tremaine LLP

(57) ABSTRACT

A server obtains response data for an asynchronous response to a request from a client. The server generates, in response to obtaining the response data, a digital signature for the response data. The server makes available the response data, the digital signature, and location information that indicates a location from which a digital certificate usable to verify the digital signature can be obtained.

20 Claims, 7 Drawing Sheets

(56) References Cited

U.S. PATENT DOCUMENTS

| | | | | |
|---|---|---|---|---|
| 2012/0323786 | A1* | 12/2012 | Kirsch | G06Q 20/0855 705/44 |
| 2013/0191884 | A1* | 7/2013 | Leicher | H04L 63/08 726/4 |
| 2013/0301830 | A1* | 11/2013 | Bar-El | H04L 9/08 380/210 |
| 2014/0136838 | A1* | 5/2014 | Mossbarger | H04L 9/006 713/156 |
| 2014/0282997 | A1* | 9/2014 | Norton | H04L 63/0807 726/10 |
| 2015/0134962 | A1* | 5/2015 | Mahajan | H04L 63/0428 713/171 |
| 2016/0087955 | A1* | 3/2016 | Mohamad Abdul | G06F 8/60 726/7 |
| 2016/0277391 | A1* | 9/2016 | Choyi | G06F 21/64 |
| 2016/0373440 | A1* | 12/2016 | Mather | H04L 63/0861 |
| 2017/0005999 | A1* | 1/2017 | Choyi | H04L 63/0435 |
| 2017/0132620 | A1* | 5/2017 | Miller | G06Q 20/3829 |
| 2017/0132621 | A1* | 5/2017 | Miller | G06Q 20/3829 |
| 2017/0279855 | A1* | 9/2017 | Roth | H04L 63/20 |
| 2017/0346851 | A1* | 11/2017 | Drake | H04L 63/1466 |
| 2018/0007059 | A1* | 1/2018 | Innes | G06F 21/33 |
| 2018/0060596 | A1* | 3/2018 | Hamel | G06F 21/64 |
| 2018/0075253 | A1* | 3/2018 | Auh | G06F 21/78 |
| 2018/0075262 | A1* | 3/2018 | Auh | G06F 21/78 |
| 2018/0167219 | A1* | 6/2018 | Campagna | H04L 9/3247 |

OTHER PUBLICATIONS

Atkinson, R., "IP Encapsulating Security Payload (ESP)," Request for Comments: 1827, Standards Track, Aug. 1995, 13 pages.
Atkinson, R., "Security Architecture for the Internet Protocol," Request for Comments: 1825, Standards Track, Aug. 1995, 23 pages.
Blake-Wilson et al., "Elliptic Curve Cryptography (ECC) Cipher Suites for Transport Layer Security (TLS)," Request for Comments: 4492, Informational, May 2006, 35 pages.
Blake-Wilson et al., "Transport Layer Security (TLS) Extensions," Request for Comments: 3546, Standards Track, Jun. 2003, 29 pages.
Blake-Wilson et al., "Transport Layer Security (TLS) Extensions," Request for Comments: 4366, Standards Track, Apr. 2006, 30 pages.
Blumenthal et al., "Pre-Shared Key (PSK) Ciphersuites with NULL1 Encryption for Transport Layer Security (TLS)," Request for Comments: 4785, Standards Track, Jan. 2007, 5 pages.
Brown et al., "Transport Layer Security (TLS) Authorization Extensions," Request for Comments: 5878, Experimental, May 2010, 19 pages.
Chown, "Advanced Encryption Standard (AES) Ciphersuites for Transport Layer Security (TLS)," Request for Comments: 3268, Standards Track, Jun. 2002, 7 pages.
Cooper et al., "Internet X.509 Public Key Infrastructure Certificate and Certificate Revocation List (CRL) Profile," Request for Comments: 5280, May 2008, 141 pages.
Cooper et al., "Internet X.509 Public Key Infrastructure: Certification Path Building," Request for Comments: 4158, Sep. 2005, 81 pages.
Dierks et al., "The TLS Protocol Version 1.0," Request for Comments 2246, Jan. 1999, 75 pages.
Dierks et al., "The Transport Layer Security (TLS) Protocol Version 1.2," Request for Comments 5246, Standards Track, Aug. 2008, 98 pages.
Eastlake, E., "Transport Layer Security (TLS) Extensions: Extension Definitions," Request for Comments: 6066, Standards Track, Jan. 2011, 25 pages.
Eronen et al., "Pre-Shared Key Ciphersuites for Transport Layer Security (TLS)," Request for Comments 4279, Dec. 2005, 16 pages.
Ford-Hutchinson, "Securing FTP with TLS," Request for Comments: 4217, Standards Track, Oct. 2005, 29 pages.

Friend, "Transport Layer Security (TLS) Protocol Compression Using Lempel-Ziv-Stac (LZS)," Request for Comments: 3943, Informational, Nov. 2004, 13 pages.
Gutmann, "Encrypt-then-MAC for Transport Layer Security (TLS) and Datagram Transport Layer Security (DTLS)," Request for Comments: 7366, Standards Track, Sep. 2014, 7 pages.
Hoffman, "SMTP Service Extension for Secure SMTP over Transport Layer Security," Request for Comments: 3207, Standards Track, Feb. 2002, 9 pages.
Hollenbeck, "Transport Layer Security Protocol Compression Methods," Request for Comments: 3749, Standards Track, May 2004, 8 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Jones et al., "JSON Web Signature (JWS)," Request for Comments 7515, May 2015, 59 pages.
Kanno et al., "Addition of the Camellia Cipher Suites to Transport Layer Security (TLS)," Request for Comments: 6367, Informational, Sep. 2011, 8 pages.
Karn, P., et al., "The ESP DES-CBC Transform," Request for Comments: 1829, Standards Track, Aug. 1995, 11 pages.
Kato et al., "Camellia Cipher Suites for TLS," Request for Comments: 5932, Standards Track, Jun. 2010, 6 pages.
Kent, "Privacy Enhancement for Internet Electronic Mail: Part II: Certificate-Based Key Management," Request for Comments: 1422, Feb. 1993, 32 pages.
Kent, S., "IP Encapsulating Security Payload (ESP)," Request for Comments: 4303, Standards Track, Dec. 2005, 45 pages.
Kent, S., "Security Architecture for the Internet Protocol," Request for Comments: 2401, Standards Track, Nov. 1998, 62 pages.
Kent, S., and K. Seo, "Security Architecture for the Internet Protocol," Request for Comments: 4301, Standards Track, Dec. 2005, 102 pages.
Khare et al., "Upgrading to TLS within HTTP/1.1," Request for Comments: 2817, Standards Track, May 2000, 13 pages.
Kim et al., "Addition of the ARIA Cipher Suites to Transport Layer Security (TLS)," Request for Comments: 6209, Informational, Apr. 2011, 9 pages.
Lee et al., "Addition of SEED Cipher Suites to Transport Layer Security (TLS)," Request for Comments: 4162, Standards Track, Aug. 2005, 6 pages.
Mavrogiannopoulos et al., "Using OpenPGP Keys for Transport Layer Security (TLS) Authentication," Request for Comments: 6091, Informational, Feb. 2011, 9 pages.
Mavrogiannopoulos, "Using OpenPGP Keys for Transport Layer Security (TLS) Authentication," Request for Comments: 5081, Experimental, Nov. 2007, 8 pages.
McGrew et al., "AES-CCM Cipher Suites for Transport Layer Security (TLS)," Request for Comments: 6655, Standards Track, Jul. 2012, 8 pages.
McGrew et al., "Datagram Transport Layer Security (DTLS) Extension to Establish Keys for the Secure Real-time Transport Protocol (SRTP)," Request for Comments 5764, May 2010, 27 pages.
Medvinsky et al., "Addition of Kerberos Cipher Suites to Transport Layer Security (TLS)," Request for Comments: 2712, Standards Track, Oct. 1999, 7 pages.
Merkle et al., "Elliptic Curve Cryptography (ECC) Brainpool Curves for Transport Layer Security (TLS)," Request for Comments: 7027, Informational, Oct. 2013, 10 pages.
Metzger, P., et al., "IP Authentication Using Keyed MD5," Request for Comments: 1828, Standards Track, Aug. 1995, 6 pages.
Moriai et al., "Addition of Camellia Cipher Suites to Transport Layer Security (TLS)," Request for Comments: 4132, Standards Track, Jul. 2005, 7 pages.
Newman, "Using TLS with IMAP, POP3 and ACAP," Request for Comments: 2595, Standards Track, Jun. 1999, 15 pages.
Orman, H., "The OAKLEY Key Determination Protocol," Request for Comments: 2412, Informational, Nov. 1998, 56 pages.
Phelan, "Datagram Transport Layer Security (DTLS) over the Datagram Congestion Control Protocol (DCCP)," Request for Comments 5238, May 2008, 11 pages.

(56) References Cited

OTHER PUBLICATIONS

Rescorla et al., "Datagram Transport Layer Security Version 1.2," Request for Comments 6347, Jan. 2012, 33 pages.

Rescorla et al., "Datagram Transport Layer Security," Request for Comments: 4347, Standards Track, Apr. 2006, 25 pages.

Rescorla et al., "Transport Layer Security (TLS) Renegotiation Indication Extension," Request for Comments: 5746, Standards Track, Feb. 2010, 15 pages.

Rescorla, "HTTP Over TLS," Request for Comments: 2818, Informational, May 2000, 7 pages.

Rescorla, "TLS Elliptic Curve Cipher Suites with SHA-256/384 and AES Galois Counter Mode (GCM)," Request for Comments: 5289, Informational, Aug. 2008, 6 pages.

Salowey et al., "Transport Layer Security (TLS) Session Resumption without Server-Side State," Request for Comments: 5077, Standards Track, Jan. 2008, 20 pages.

Salowey, "AES Galois Counter Mode (GCM) Cipher Suites for TLS," Request for Comments: 5288, Standards Track, Aug. 2008, 8 pages.

Salter et al., "Suite B Profile for Transport Layer Security (TLS)," Request for Comments: 6460, Informational, Jan. 2012, 14 pages.

Santesson et al., "TLS User Mapping Extension," Request for Comments: 4681, Standards Track, Oct. 2006, 11 pages.

Santesson, "TLS Handshake Message for Supplemental Data," Request for Comments: 4680, Standards Track, Sep. 2006, 9 pages.

Santesson, S., "X.509 Internet Public Key Infrastructure Online Certificate Status Protocol—OCSP," Request for Comments: 6960, Standards Track, Jun. 2013, 41 pages.

Taylor et al., "Using the Secure Remote Password (SRP) Protocol for TLS Authentication," Request for Comments: 5054, Informational, Nov. 2007, 24 pages.

Tuexen et al., "Datagram Transport Layer Security (DTLS) for Stream Control Transmission Protocol (SCTP)," Request for Comments 6083, Jan. 2011, 10 pages.

Turner et al., "Prohibiting Secure Sockets Layer (SSL) Version 2.0," Request for Comments 6176, Mar. 2011, 4 pages.

* cited by examiner

DIGITAL SIGNATURE VERIFICATION FOR ASYNCHRONOUS RESPONSES

BACKGROUND

Computing resource services and other services often provide responses to clients asynchronously. For instance, in response to a request from a client, a service provides a response to the request to another entity that can transfer the response to the client at a later time. However, it can be difficult to verify that the response obtained from the other entity originated from the server to which the request was sent or otherwise from a trusted entity. It may also be difficult to ensure that the response has not been tampered with from the time at which the response was generated to the time at which a client receives the response from the other entity.

BRIEF DESCRIPTION OF THE DRAWINGS

Various techniques will be described with reference to the drawings, in which.

DETAILED DESCRIPTION

Figure 1:
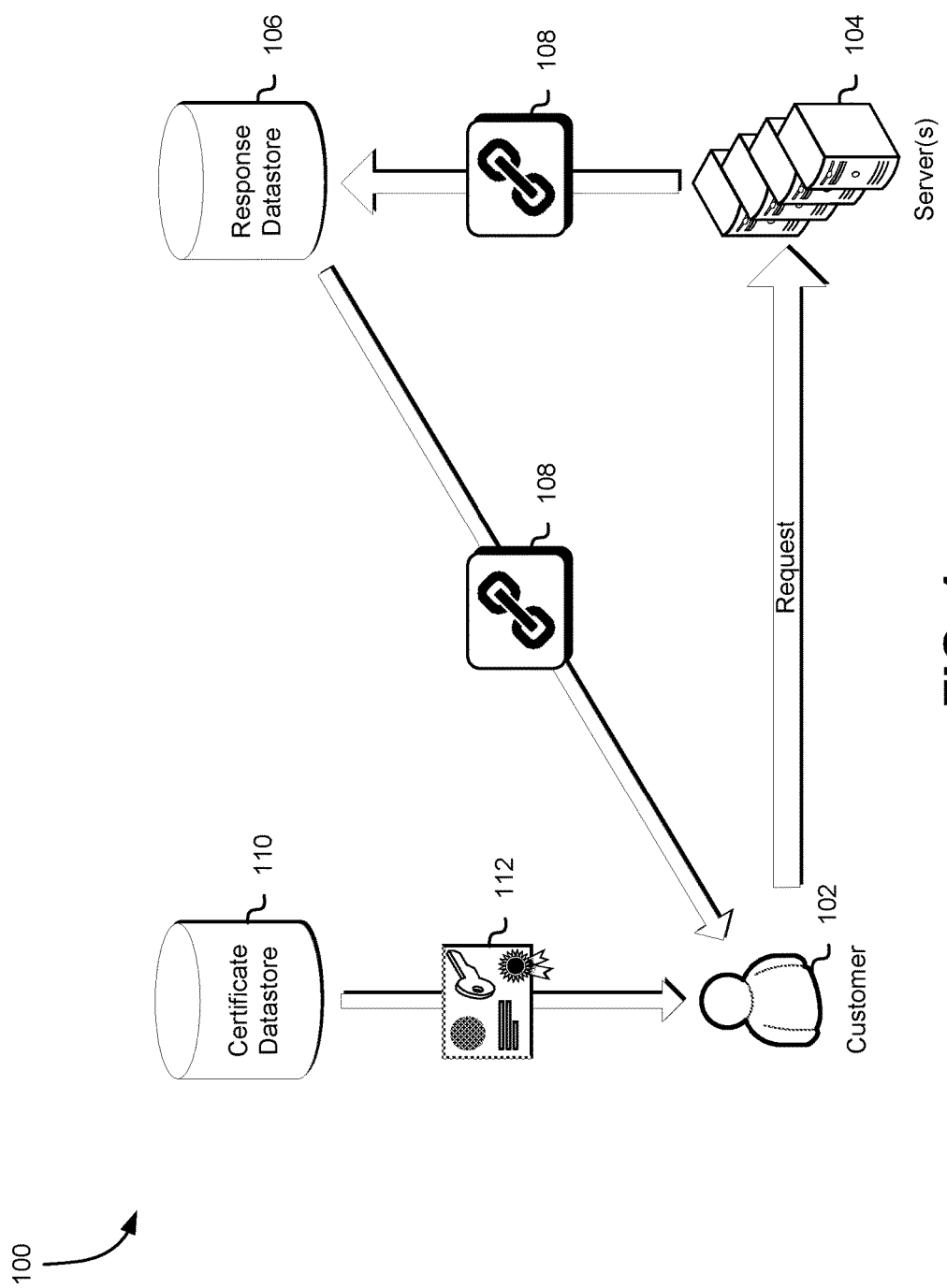
FIG. 1 shows an illustrative example of an environment in which various embodiments can be implemented.

This patent application relates to the verification of digital signatures in asynchronous responses to ensure that these responses originated from a trusted server. In an example, a client establishes a secure communications session with a server to transmit a request for data that can be fulfilled by the server. In a response generated to fulfill the request, the server may identify the location of a digital certificate that is digitally signed by a certificate authority and includes a public cryptographic key of the server. For instance, the server may be issued with a digital certificate by a certificate authority in response to a request from the server. The server may store this digital certificate in a certificate repository that includes digital certificates for the server and other servers of a computing resource service or other service. The server may generate a response to the client's request and include, in the response, a Uniform Resource Identifier (URI) corresponding to the location of the digital certificate of the server. Additionally, the response may include a digital signature of the server, which may be generated using a private cryptographic key of a cryptographic key pair that includes the public cryptographic key included in the digital certificate. The server may provide the response to another entity, such as another server or service for dissemination of the response to the client.

In some examples, the server monitors an existing digital certificate references in its responses to detect any issues that may impact the validity of the digital certificate. For instance, the server may determine whether the digital certificate has expired. Alternatively, the service may receive a notification from a security service or the certificate authority indicating that the digital certificate has been compromised. If the server detects an issue with the digital certificate, the service may obtain a new digital certificate from the certificate authority, which it may store in the certificate repository. The server may determine the location of the digital certificate within the certificate repository and generate a new URI corresponding to this location. In response to any new requests from a client, the service may incorporate this new URI into the response and provide the response to another entity for dissemination to the client.

In response to receiving the server response from another entity, the client may evaluate the response to determine whether it specifies a URI for the location of a digital certificate that can be used to verify the digital signature included in the response. If the response does not specify a URI for the location of the digital certificate, the client may determine that the response is not valid and reject the response. Alternatively, if the response does include a URI for the location of the digital certificate, the client may use the URI to obtain the digital certificate from the certificate repository. The client may evaluate the digital certificate to identify the subject specified in the digital certificate. The subject may correspond to the server or other entity to which the digital certificate was issued. Based on the subject specified in the digital certificate, the client may determine whether the digital certificate was issued to a trusted server, such as the server to which the client made the original request or to another entity that is trusted by the client. If the subject specified in the digital certificate does not correspond to a trusted server, the client may reject the received response as it did not originate from a trusted server.

If the digital certificate was issued by the certificate authority to a trusted server, the client may further evaluate the digital certificate to determine whether it is valid. This may include determining whether the digital certificate has expired or is active. Additionally, the client may verify that the digital certificate is authentic by verifying the digital signature of the certificate authority in the digital certificate. If the digital certificate is not valid, the client may reject the response. However, if the digital certificate is valid, the client may use the server's public cryptographic key from the digital certificate to verify the digital signature included in the response to the request. If the digital signature of the server provided in the response is valid, the client may accept the response from the other entity as having originated from the server.

In this manner, a client may verify that an asynchronous response obtained from an entity on behalf of the server originated from the server, which is trusted by the client. In addition, the techniques described and suggested in this disclosure enable additional technical advantages. For instance, because the server embeds a URI for the digital certificate in its responses, the server may rotate its cryptographic keys as needed by modifying the URI specified in the response to indicate the location of a new digital certificate that includes the server's latest public cryptographic key. Additionally, if the server's private cryptographic key or the digital certificate is compromised, the compromised digital certificate can be added to a certificate revocation list, which the client may use to fail validation of the response and the digital certificate.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a customer 102 of a computing service may transmit a request to one or more servers 104 to establish a communications channel between a customer's client device and the one or more servers 104. A customer 102, via a client, may submit an application layer (e.g., HyperText Transfer Protocol Secure (HTTPS), file transfer protocol, etc.) request to a destination server 104 (e.g., network server) to establish a secure network communications channel, such as a Transport Layer Security/Secure Sockets Layer (TLS/SSL) secure channel. Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366, which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

The client may be a computer system that may include one or more applications installed on the computer system configured to access and communicate with a service made available through a destination server 104. The client may communicate with the destination server 104 through one or more communications networks, such as the Internet. The application layer request from the user client may include an informational field, such as a user-agent field, which may be used by the destination server 104 to determine the application purportedly utilized by the client to transmit the request. For instance, the user-agent field may specify a browser application (e.g., Internet Explorer®, Firefox®, Chrome®, etc.) used by the client to communicate with the destination server 104. Additionally, the client may specify, for the secure network communications session to be established, negotiable features (e.g., cipher suites, etc.) that may be utilized by the destination server 104 to communicate with the client through the secure communications channel. While user-agents and cipher suites are used extensively throughout the present disclosure for the purpose of illustration, other information relating to the client and the communications channel, including other attributes of the client and other features may be used.

The destination server 104 may be a web server configured to provide web pages viewable through a browser application. Alternatively, the destination server 104 may be a file server that may be configured to enable clients to access one or more files remotely through the secure communications channel. Generally, the destination server may be any server configured to establish a secure communications channel and implement various techniques described herein. In an embodiment, the destination server 104 provides data to the client in response to requests for the data via another entity through an asynchronous process. For instance, the destination server 104 may provide data to a response datastore 106, which may provide the data to the client on behalf of the destination server 104. The response datastore 106 may include computer systems of the service that implements the one or more servers 104. Alternatively, the response datastore 106 may include computer systems or storage devices of another service. For instance, the other service may provide logical data containers (e.g., a virtual storage location, which may be implemented as an identifier such that, if a data object is associated with the identifier, it is considered to be within the logical data container) through which the data generated by the server 104 may be associated with the identifier corresponding to a logical data container. The data provided in response to a customer 102 request may be provided by the response datastore 106 at a later time. For instance, in response to a request, a destination server 104 may query an archival datastore to obtain the data requested by the customer 102, which may not be an expeditious process. The destination server 104 may provide this data to the response datastore 106 for dissemination to the customer 102.

In an embodiment, the destination server 104 generates a digital certificate signing request to obtain a digital certificate 112 that may be presented to customers 102 and other entities to enable authentication of the destination server 104. The digital certificate signing request may specify a public cryptographic key for the destination server 104, which may be part of a cryptographic key pair generated by the destination server 104. The request may also include parameters that indicate parameters to be included in the digital certificate 112 such as a subject that corresponds to the destination server 104 submitting the request and a validity period for the digital certificate 112. The destination server 104 may transmit the digital certificate signing request to a certificate authority that may be trusted by both the destination server 104 and the client device of the customer 102. In response to the digital certificate signing request, the destination server 104 may obtain a digital certificate 112 from the certificate authority. In some embodiments, the certificate authority instead stores the digital certificate in a certificate datastore 110. The certificate datastore 110 may include computer systems or storage devices of a service that may also provide the destination server 104 or the certificate authority. If the certificate authority stores the digital certificate 112 in the certificate datastore 110, the certificate authority may provide the destination server 104 with a URI or other location identifier corresponding to the location of the digital certificate 112 in the certificate datastore 110. In some embodiments, the certificate authority provides the digital certificate 112 to the destination server 104 to fulfill the digital certificate signing request. In response to obtaining the digital certificate 112 from the certificate authority, the destination server 104 may store the digital certificate 112 in the certificate datastore 110. The destination server 104 may obtain, from the certificate datastore 110, the URI or other location identifier corresponding to the location of the digital certificate 112 in the certificate datastore 110.

In an embodiment, the destination server 104 generates a JavaScript Object Notation (JSON) Web Signature (JWS) token 108 that includes the response to the client request. The JWS token 108 may include at least three different components: a header, the payload, and a digital signature. The header may include metadata for the token that may specify the type of digital signature included in the token and the encryption algorithm utilized to generate the digital signature. In an embodiment, the destination server 104 embeds the URI or other location identifier for the digital certificate 112 into the header of the JWS token 108. For instance, the destination server 104 may create an "x5u" or X.509 URI header parameter within the header of the JWS token 108 to specify the URI for the location of the digital certificate 112. The payload of the JWS token 108 may include the data that is to be provided to the client as a response to the client's request. The payload may also include various claims regarding the entity that generated the JWS token 108 (e.g., the destination server 104) and other information about the JWS token 108 itself. The JWS token 108 may also include a digital signature, which may be generated by combining the encoded header and payload of the JWS token 108 and signing this combination using the destination server's private cryptographic key of the cryptographic key pair. The features of the JWS token 108 are further defined in RFC 7515 which is incorporated herein by reference. It should be noted that while JWS tokens are used extensively throughout the present disclosure for the purpose of illustration, other tokens and data structures may be utilized for dissemination of the response to the client's request and the location identifier for the digital certificate 112.

The destination server 104 may transmit the JWS token 108 to the response datastore 106. In response to receiving the JWS token 108 from the destination server 104, the response datastore 106 may identify the client that generated the original request to obtain a response from the destination server 104 and transmit the JWS token 108 to the client of the customer 102. In response to receiving the JWS token 108 from the response datastore 106, the client may evaluate the JWS token 108 to determine whether the JWS token 108 specifies a location of a digital certificate 112 that can be used to obtain a public cryptographic key of the server 104 that can be used to verify the authenticity of the digital signature included in the JWS token 108. If the JWS token 108 does not specify a location for the digital certificate 112, the client may reject the JWS token 108 as the client may be unable to verify the authenticity of the JWS token 108 without a digital certificate 112.

If the JWS token 108 specifies a URI or other location identifier for the location of the digital certificate 112, the client may utilize the URI or other location identifier to access the certificate datastore 110 and obtain the digital certificate 112. The client may evaluate the digital certificate 112 to determine whether it is valid and to obtain the public cryptographic key of the destination server 104, which can be used to verify the authenticity of the digital signature in the JWS token 108. For instance, the client may evaluate the digital certificate 112 to determine whether it specifies, as the subject of the digital certificate 112, the destination server 104 to which the client delivered its request. If the digital certificate 112 does not identify the destination server 104 as the subject of the digital certificate 112, the client may determine that the digital certificate 112 cannot be used to verify that the JWS token 108 was generated by the destination server 104. Thus, if the destination server 104 is not identified as the subject of the digital certificate 112, the client may reject the JWS token 108.

The client may further determine whether the digital certificate 112 has expired or is active for use. For instance, the digital certificate 112 may specify a validity period during which the digital certificate 112 may be used for authentication purposes. If the digital certificate 112 has expired or the validity period has not begun, the client may determine that the digital certificate 112 is not valid for use. Additionally, if the digital certificate 112 is digitally signed by the certificate authority, the client may utilize a public cryptographic key of the certificate authority to verify that the digital certificate 112 is authentic and was digitally signed by the certificate authority. If the client determines that the digital certificate 112 is authentic, the client may obtain the destination server's public cryptographic key from the digital certificate 112 and utilize this public cryptographic key to verify the digital signature in the JWS token 108. If the client is unable to verify the digital signature specified in the JWS token 108, the client may reject the JWS token 108. Otherwise, if the digital signature in the JWS token 108 is valid, the client may obtain the response from the payload of the JWS token 108.

In some embodiments, the certificate authority maintains a certificate revocation list, which specifies identifiers for digital certificates that have been revoked. The certificate authority may revoke a digital certificate 112 if the certificate authority determines that the private cryptographic key of the destination server 104 has been compromised or the destination server 104 has not complied with certain requirements set forth by the certificate authority for maintaining the integrity of the cryptographic keys. For instance, if the destination server 104 provides its private cryptographic key to other entities, the certificate authority may revoke the digital certificate 112 that includes a public cryptographic key that corresponds to a cryptographic key pair of which the private cryptographic key is a part. The client may obtain the certificate revocation list or updates to the certificate revocation list from the certificate authority periodically or in response to changes to the certificate revocation list. Thus, the client may evaluate the certificate revocation list to determine whether the digital certificate 112 from the certificate datastore 110 is valid for use. In other embodiments, the client transmits an Online Certificate Status Protocol (OCSP) request to the certificate authority to determine whether the digital certificate 112 is valid. The OCSP request may specify a certificate serial number for the digital certificate 112, which the certificate authority may use to determine the revocation status of the digital certificate within a database maintained by the certificate authority. Based at least in part on the revocation status, the certificate may transmit an OCSP response to the client indicating the revocation status of the digital certificate 112. OCSP is described in RFC 6960, which is incorporated by reference.

Figure 2:
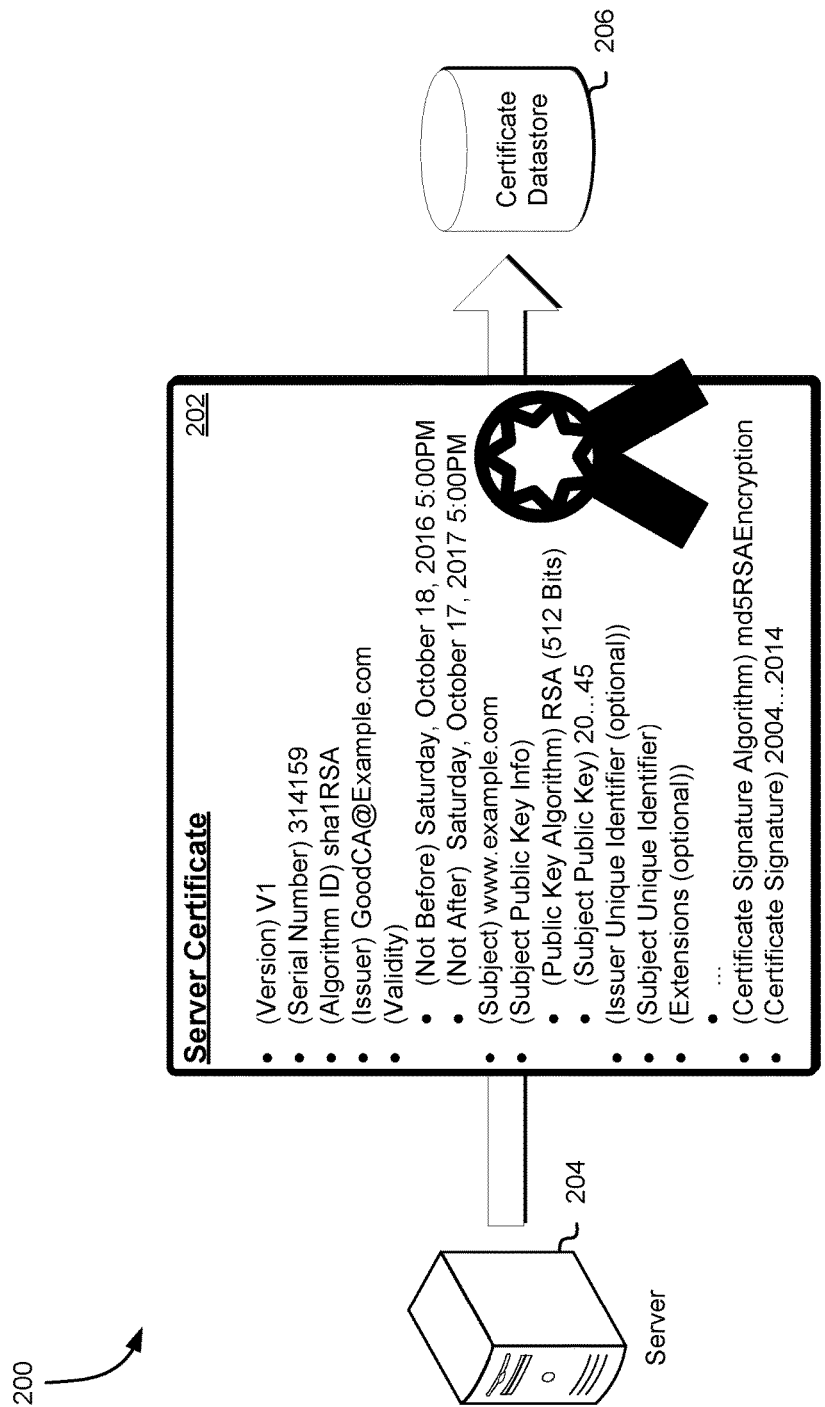
FIG. 2 shows an illustrative example of an environment in which a server transmits a server digital certificate to a certificate datastore to make the server digital certificate available for verifying responses generated by the server in accordance with at least one embodiment.

As noted above, a destination server may obtain a digital certificate from a certificate authority that includes the destination server's public cryptographic key. The destination server may transmit the digital certificate to a certificate datastore and obtain a URI or other location identifier that indicates the location of the digital certificate within the certificate datastore. Accordingly, FIG. 2 shows an illustrative example of an environment 200 in which a server 204 transmits a server digital certificate 202 to a certificate datastore 206 to make the server digital certificate 202 available for verifying responses generated by the server 204 in accordance with at least one embodiment. In the environment 200, the server 204 obtains a server digital certificate 202 from a certificate authority that includes at least the server's public cryptographic key. The server's public cryptographic key can be used to verify the authenticity of any data provided by the server 204 that is digitally signed by the server 204 using its private cryptographic key.

In an embodiment, the server digital certificate 202 is an X.509 certificate, although other digital certificate encodings are also considered as being within the scope of the present disclosure. In this particular example, the server digital certificate 202 includes various fields such as a version, a serial number, an algorithm identifier, an issuer, fields for validity periods, a subject field, fields about the public cryptographic key, issuer unique identifier fields, subject unique identifier fields, extension fields, certificate signature algorithm fields, and a certificate signature field. X.509 certificates are described in RFC 4158, RFC 5280, and RFC 1422, which are incorporated by reference.

The server 204 may obtain the digital certificate 202 from the certificate authority as fulfillment of a digital signature signing request generated by the server 204 and provided to the certificate authority. The digital certificate signing request may include encrypted verification data and a public cryptographic key generated by the server 204 as part of a cryptographic key pair generation process and that is to be used in the creation of the digital certificate 202. The certificate authority may identify a validity period for the digital certificate 202 and specify this validity period using one or more fields of the digital certificate 202. If the certificate authority successfully authenticates the server 204, the certificate authority may digitally sign the digital certificate 202 and provide the digital certificate 202 to the server 204 to fulfill the digital certificate signing request.

The digital certificate signing request may be generated by the server 204 at any time. For instance, the server 204 may generate a digital certificate signing request in response to a request from a client to obtain data from the server 204. This may enable the server 204 to provision a digital certificate 202 for each request received from a client to obtain certain data. The digital certificate signing request may be generated by the server 204 upon receiving the request from the client or after generating the data that is to be included in the payload of the JWS token that is to be transmitted to a response datastore for dissemination to the client. Alternatively, the server 204 may generate the digital certificate signing request independent of any request obtained from a client. Thus, the server 204 may utilize the same digital certificate 202 for various client requests instead of generating a new digital certificate 202 for each incoming request from a client.

In response to receiving the digital certificate 202 from the certificate authority, the server 204 may transmit the digital certificate 202 to a certificate datastore 206 to make the digital certificate 202 available to other entities. The certificate datastore 206, through a computer system of a service that maintains the certificate datastore 206, may generate a URI or other location identifier that may be used to identify the location of the digital certificate 202 within the certificate datastore 206. The certificate datastore 206, through a computer system of the service that maintains the certificate datastore 206, may transmit the URI or other location identifier for the digital certificate 202 to the server 204. In some embodiments, the certificate authority provides the digital certificate 202 to the certificate datastore 206 and obtains the URI or other location identifier for the digital certificate 202 from the certificate datastore 206. The certificate authority may provide the URI or other location identifier to the server 204 in response to the digital certificate signing request from the server 204.

Figure 3:
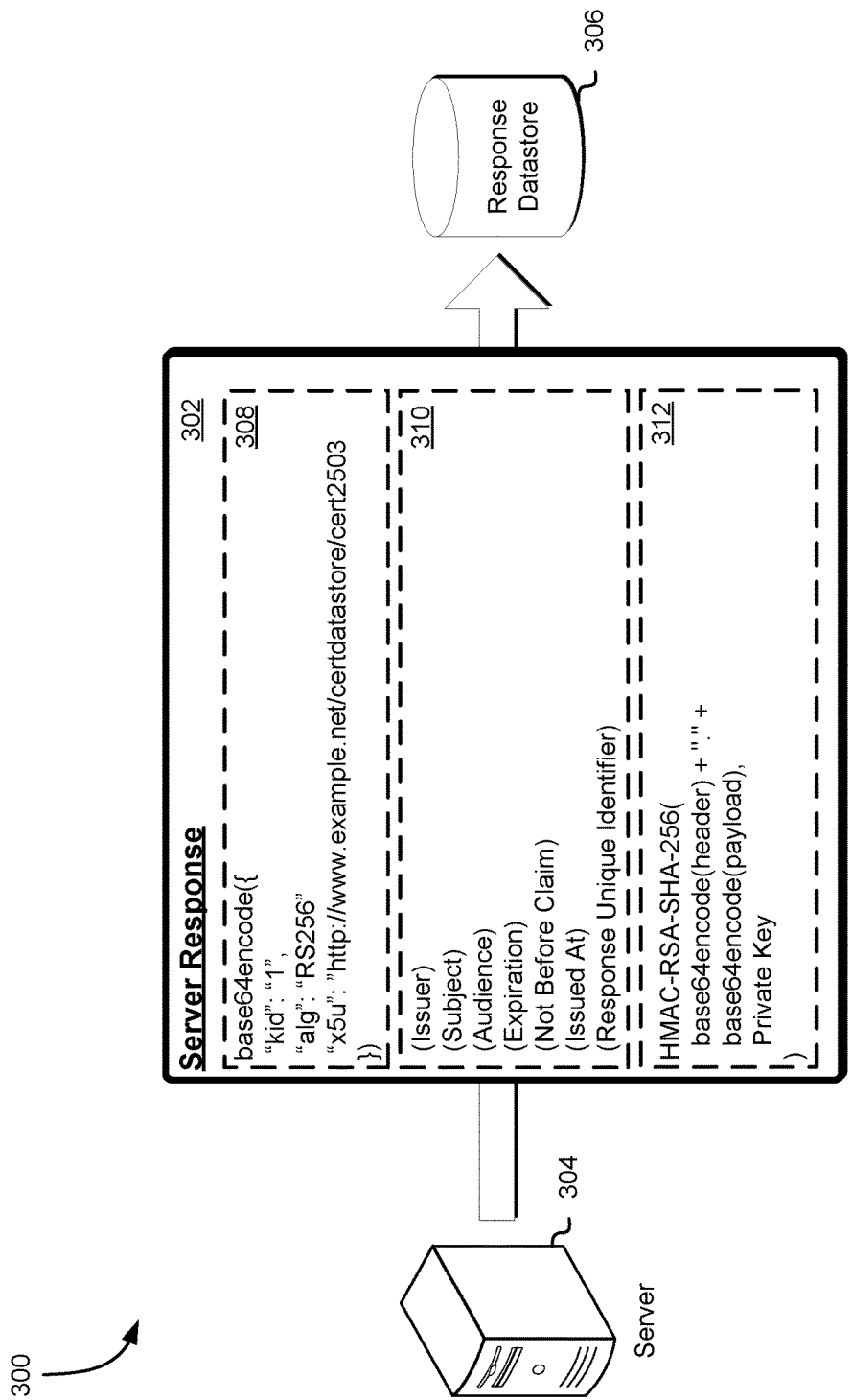
FIG. 3 shows an illustrative example of an environment in which a server transmits a server response that indicates a location of a server digital certificate usable for verifying the response to a response datastore in accordance with at least one embodiment.

The server may provide a response to the client's request in the form of a JWS token, which the server may transmit to response datastore for dissemination to the client. The JWS token may specify the URI or other location identifier for a digital certificate that can be used to verify the server's digital signature included in the JWS token. Further, the response to the client's request may be embedded in the JWS token. Accordingly, FIG. 3 shows an illustrative example of an environment 300 in which a server 304 transmits a server response that indicates a location of a server digital certificate usable for verifying the response to a response datastore 306 in accordance with at least one embodiment.

In the environment 300, the server 304 generates a JWS token 302 that includes the response to a client's request. This JWS token 302 may be represented as a sequence of encoded values that are separated by a particular character, such as a period or other symbolic expression. The encoded values in the JWS token 302 may include at least a header 308, a payload 310, and a digital signature 312. The header 308 of the JWS token 302 may include metadata for the token 302 that may specify the type of digital signature included in the token 302 and the encryption algorithm utilized to generate the digital signature. In an embodiment, the server 304 embeds the URI or other location identifier for the digital certificate into the header 308 of the JWS token 302. For instance, the server may create an "x5u" or X.509 URI header parameter within the header 308 of the JWS token 302 to specify the URI for the location of the digital certificate.

The payload 310 of the JWS token 302 may include the data that is to be provided to the client as a response to the client's request. The payload 302 may also include various claims regarding the entity that generated the JWS token 302 (e.g., the server 304) and other information about the JWS token 302 itself. For instance, the payload 310 may specify one or more registered claims that may be utilized to specify an identifier of the server 304 (e.g., issuer), the subject of the JWS token 302, the audience or recipients of the token, a validity period for the JWS token 302, the time at which the JWS token 302 was issued, and a unique identifier for the JWS token 302.

The JWS token 302 may also include a digital signature 312, which may be generated by combining the encoded header and payload of the JWS token 302 and signing this combination using the server's private cryptographic key of the cryptographic key pair. A recipient of the JWS token 302 may utilize the cryptographic algorithm specified in the JWS token 302, as well as the server's public cryptographic key, to verify the digital signature specified in the JWS token 302. The URI or other location identifier for the digital certificate and the response to the client may be included in the JWS token 302. Thus, the server 304 may obtain the URI or other location identifier for the digital certificate and the response to the client's request prior to generating the digital signature that is to be included in the JWS token 302.

The server 304 may transmit the JWS token 302 to the response datastore 306, which may store the JWS token 302 for dissemination to the client. For instance, the response datastore 306 may add the JWS token 302 to a queue of responses, whereby the response datastore 306 may transmit the JWS token 302 to the client once the JWS token 302 reaches the top of the queue. Alternatively, the response datastore 306 may transmit a notification to the client to indicate that the JWS token 302 is available in response to the client's request to the server 304. In some instances, the response datastore 306 transmits an acknowledgement to the server 304 to indicate that the JWS token 302 has been stored successfully for dissemination to the client. The server 304 may transmit this acknowledgement to the client to enable the client to identify the entity that will be providing the response from the server 304. In an embodiment, the server provides an acknowledgement to the client indicating an identifier corresponding to the response data generated by the server. The identifier may be used by the client to retrieve the JWS token 302 from the response datastore 306. The identifier may include a URI corresponding to the location of the JWS token 302 within the response datastore 306. Alternatively, in response to the client request, the server may provide an identifier corresponding to a job for creation of the response to the client request. This identifier may be used to identify the status of the job and to obtain the JWS token 302 once the job has been completed.

Figure 4:
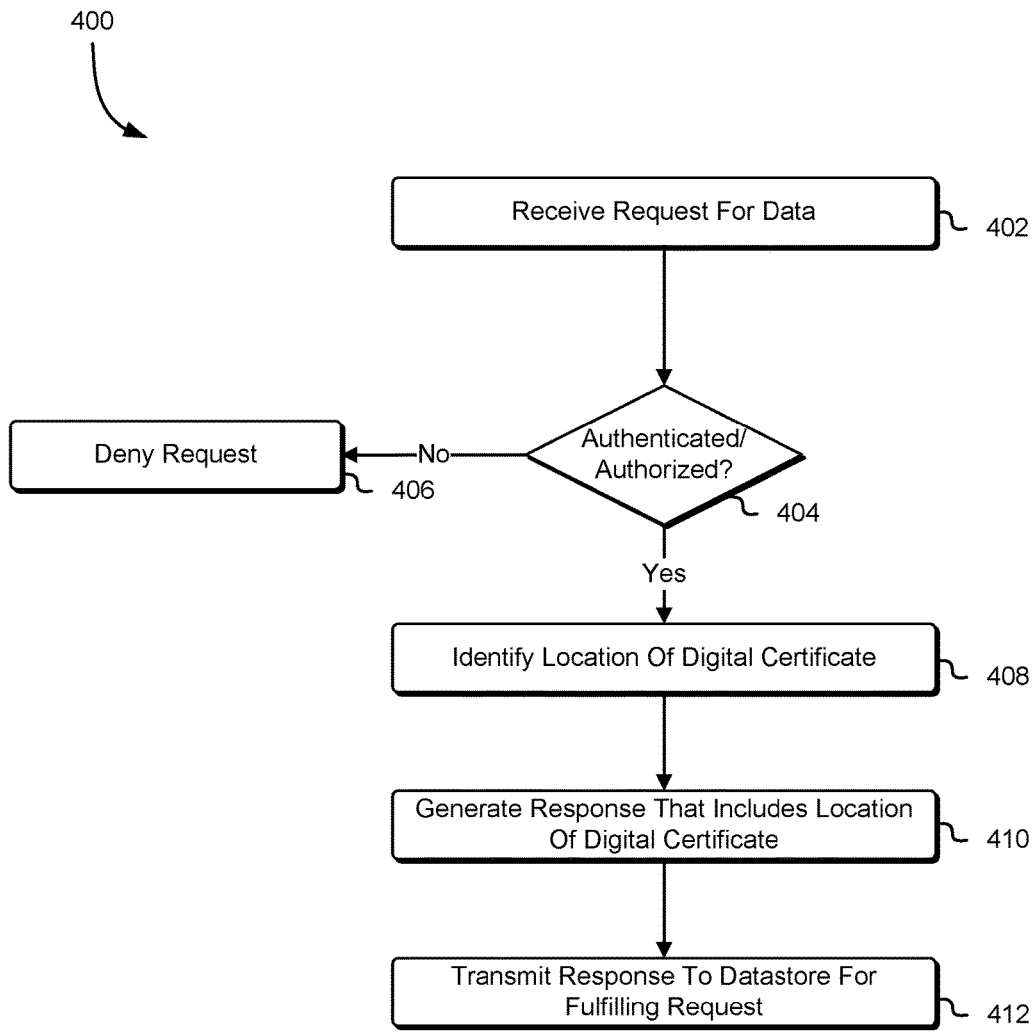
FIG. 4 shows an illustrative example of a process for transferring a response to a request for data to a datastore for asynchronous delivery of the response to a requestor in accordance with at least one embodiment.

As noted above, a server may receive a request from a client for data. The server may generate a JWS token that includes the requested data, as well as a URI or other location identifier for a digital certificate that can be used to authenticate the JWS token as having originated from the server. For instance, the JWS token may include a digital signature of the server, which may be generated using a private cryptographic key of a cryptographic key pair created by the server. The public cryptographic key of this cryptographic key pair may be included in the digital certificate, whose location may be specified in the JWS token. In some instances, the server may transmit the JWS token (e.g., response) to a response datastore, which may provide the response to the client or otherwise make the response available to the client. Accordingly, FIG. 4 shows an illustrative example of a process 400 for transferring a response to a request for data to a datastore for asynchronous delivery of the response to a requestor in accordance with at least one embodiment. The process 400 may be performed by a server that can generate JWS tokens comprising a digital signature of the server and that can obtain digital certificates for use in the authentication of the JWS tokens.

At any time, the server may receive 402, over a communications channel, a request for data from a client. For instance, a customer of a computing service may transmit a request to the servers to establish a communications channel between a customer's client device and the server. A customer, via a client, may submit an application layer (e.g., HTTPS, file transfer protocol, etc.) request to the server to establish a secure network communications channel, such as a TLS/SSL secure channel. Once the secure network communications channel has been established, the server may process incoming requests from the client, as the client may have been authenticated through the process used to establish the secure network communications channel. Alternatively, the request may include credential information for authentication. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like.

In response to the request from the client, the server may determine 404 whether the request can be authenticated and, if so, whether the client is authorized to obtain the requested data. For instance, the server may transmit the credential information included in the request to an authentication service. The authentication service may evaluate the provided information to determine whether the client can be authenticated. For example, the authentication service may access a user profile for the client to obtain information that can be used to verify the provided information. If the authentication service determines that the information provided is valid and corresponds to the client, the authentication service may authenticate the client and transmit a notification to the server to indicate that the client has been successfully authenticated. If the client cannot be authenticated or is not authorized to obtain the requested data, the server may deny 406 the request. This may include transmitting a notification to the client to indicate that the request has been denied. Additionally, or alternatively, the server may terminate the secure network communications channel between the client and the server.

If the server determines that the request is authentic and that the client is authorized to obtain the requested data, the server may identify 408 the location of a digital certificate that includes a public cryptographic key of a cryptographic key pair generated by the server and that is digitally signed by a certificate authority trusted by both the server and the client. In an embodiment, in response to the request from the client, the server generates a digital certificate signing request that is transmitted to the certificate authority to obtain a digital certificate. The server may generate a cryptographic key pair comprising a public cryptographic key and a private cryptographic key. The server may transmit, in the digital certificate signing request, the public cryptographic key and other information that is to be included in the digital certificate that can be used to determine that the digital certificate was issued to the server. This may include a server identifier, a server network address, and the like. The certificate authority may provide, to the server, the digital certificate to fulfill the digital certificate signing request. The server may store the digital certificate in a certificate repository, as described above, and obtain a URI or other location identifier for the digital certificate. In another example, the server may submit a request to the certificate authority to generate the digital certificate at a time independent of the time at which the request from the client is received. Thus, the server may utilize the same URI or location identifier for the digital certificate in response to client requests to obtain data from the server, as long as the digital certificate is valid.

The server may generate 410 the response to the client's request and include, within the response, the URI or location identifier for the digital certificate. For instance, the server may generate a JWS token that includes the response to the client request. The JWS token may include at least three different components: a header, the payload, and a digital signature. The header may include metadata for the token that may specify the type of digital signature included in the token and the encryption algorithm utilized to generate the digital signature. The server may embed the URI or other location identifier for the digital certificate into the header of the JWS token. For instance, the server may create an "x5u"

or X.509 URI header parameter within the header of the JWS token to specify the URI for the location of the digital certificate. The payload of the JWS token may include the data that is to be provided to the client as a response to the client's request. The payload may also include various claims the server and other information about the JWS token itself. The JWS token may also include a digital signature, which may be generated by combining the encoded header and payload of the JWS token and signing this combination using the server's private cryptographic key of the cryptographic key pair. In some instances, the server may generate the response prior to obtaining the location of the digital certificate. Alternatively, the server may generate the response to be includes in the JWS token in response to identifying the location of the digital certificate.

The server may transmit 412 the response (e.g., the JWS token) to a response datastore for fulfillment of the client request. In response to receiving the JWS token from the server, the response datastore may identify the client that generated the original request to obtain a response from the server and transmit the JWS token to the client. Alternatively, the response datastore may add the JWS token to a queue of responses, whereby the response datastore may transmit the JWS token to the client once the JWS token reaches the top of the queue. As another example, the response datastore may transmit a notification to the client to indicate that the JWS token is available in response to the client's request to the server. In some instances, the response datastore transmits an acknowledgement to the server to indicate that the JWS token has been stored successfully for dissemination to the client. The server may transmit this acknowledgement to the client to enable the client to identify the entity that will be providing the response from the server. Thus, the server may make available the response data, the digital signature, and a link to the digital certificate for verifying the digital signature.

Figure 5:
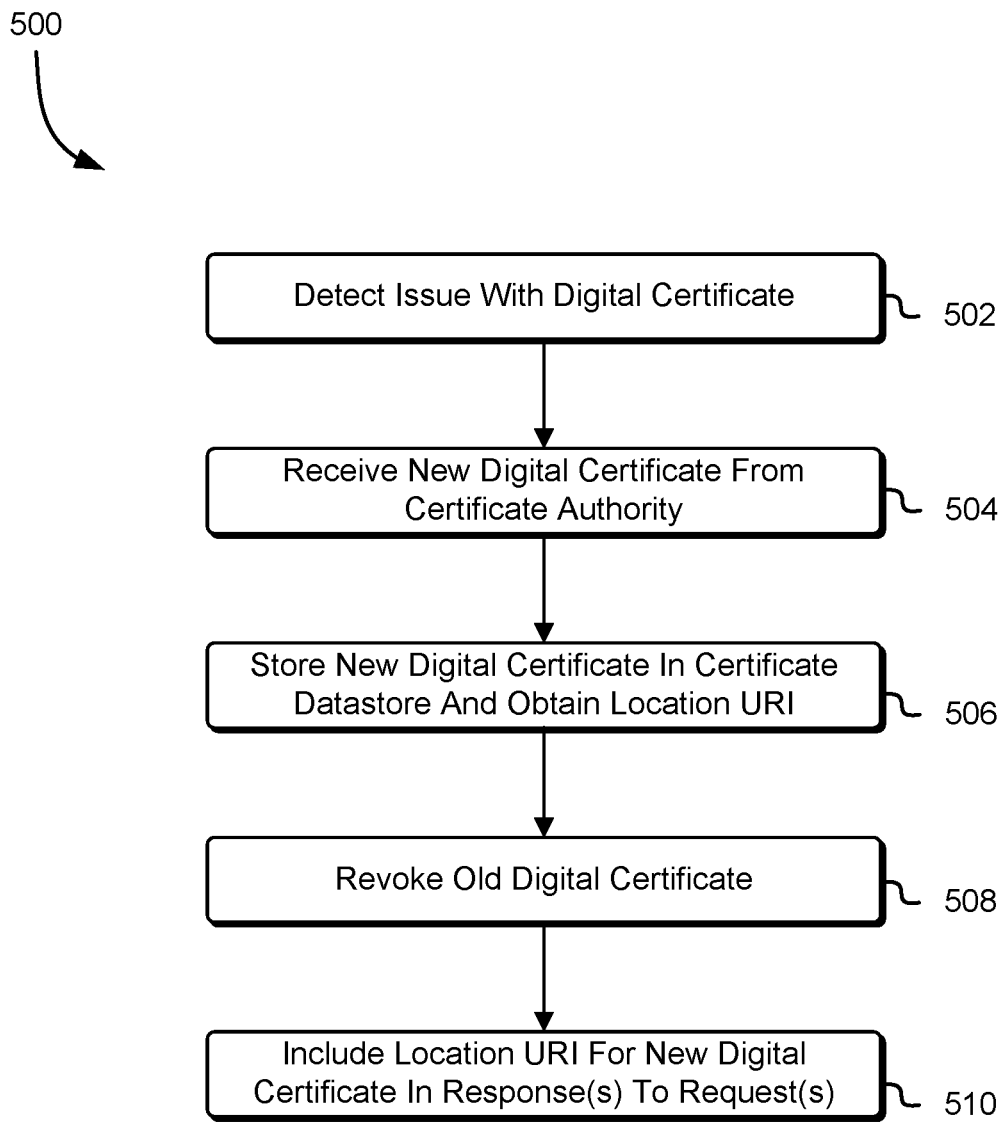
FIG. 5 shows an illustrative example of a process for obtaining a new digital certificate in response to detection of an issue regarding an existing digital certificate in accordance with at least one embodiment.

As noted above, a digital certificate may be revoked if an issue with the digital certificate is detected. For instance, if the server's private cryptographic key is compromised, the server may obtain a new digital certificate and transmit a request to the certificate authority to revoke any digital certificates that include a public cryptographic key that corresponds to the private cryptographic key. Further, the server may store this new digital certificate in the certificate datastore and obtain a new URI or location identifier for the storage location of this new digital certificate. Any new responses generated by the server may include this new URI or other location identifier. Accordingly, FIG. 5 shows an illustrative example of a process 500 for obtaining a new digital certificate in response to detection of an issue regarding an existing digital certificate in accordance with at least one embodiment. The process 500 may be performed by a server that may obtain digital certificates from a certificate authority and that may store these digital certificates in a certificate repository.

At any time, the server may detect 502 an issue with a particular digital certificate previously obtained by the server from the certificate authority and stored within the certificate repository. For instance, the certificate authority may determine that the private cryptographic key of the server has been compromised. Alternatively, the certificate authority determines that its own private cryptographic key or the certificate authority itself has been compromised. Under either circumstance, the certificate authority may transmit a notification to the server to indicate that one or more digital certificates have been compromised. In some instances, an issue may arise whereby a digital certificate has become invalid for use (e.g., expired, revoked, etc.). The server may also receive notifications from users and clients indicating issues with the digital certificate. For example, these clients and users may transmit a notification to the service indicating that the digital certificate cannot be used for authentication of responses from the server.

In response to detecting an issue with a particular digital certificate, the server may receive 504 a new digital certificate from the certificate authority. For instance, if the certificate authority determines that a digital certificate has been compromised, the certificate authority may request that the server generate a new cryptographic key pair and provide the public cryptographic key for this new cryptographic key pair to the certificate authority. The certificate authority may generate the new digital certificate using the new public cryptographic key and provide the new digital certificate to the server. Alternatively, the certificate authority may generate a new digital certificate using the previously provided public cryptographic key if the issue involves expiration of an existing digital certificate.

The server, upon receiving the new digital certificate, may store 506 the new digital certificate in the certificate datastore. Additionally, the server may obtain, from the certificate datastore, a URI or other location identifier for the location of the new digital certificate within the certificate datastore. In some embodiments, the certificate authority provides the new digital certificate to the certificate repository and provides the URI or other location identifier to the server. Alternatively, in response to receiving the digital certificate from the certificate authority, the certificate repository may provide the URI or other location identifier for the location of the new digital certificate to the server.

In addition to storing the new digital certificate, the server may revoke 508 the old digital certificate in order to prevent use of the old digital certificate for authentication of server responses. The server may transmit a request to the certificate authority to add the old digital certificate to a certificate revocation list, which may be available to clients and other entities that are configured to trust the certificate authority. Thus, if an entity receives the old digital certificate, the entity may determine that the old digital certificate is included in the certificate revocation list and not use it for authentication of a response. In some embodiments, if the old digital certificate is expired, revocation is not required as the digital certificate may specify an expiration date for the digital certificate. Thus, a client that receives an expired digital certificate may determine that it is expired based at least in part on an expiration date field of the digital certificate, without need to review a certificate revocation list.

In response to any new requests from a client, the server may include 510 the URI or other location identifier for the location of the new digital certificate in the response to the request. For instance, the JWS token generated by the server may include, in the "x5u" header field, the URI or other location identifier. Thus, if the client receives the JWS token from the response repository, the client may obtain the new digital certificate instead of a revoked digital certificate. Additionally, if a client receives a response that includes a URI or other location identifier corresponding to a revoked digital certificate, the client may determine that the response cannot be authenticated and generate a new request to the server to obtain a new response to its request. Thus, the client may obtain the latest digital certificate for authentication of the server.

Figure 6:
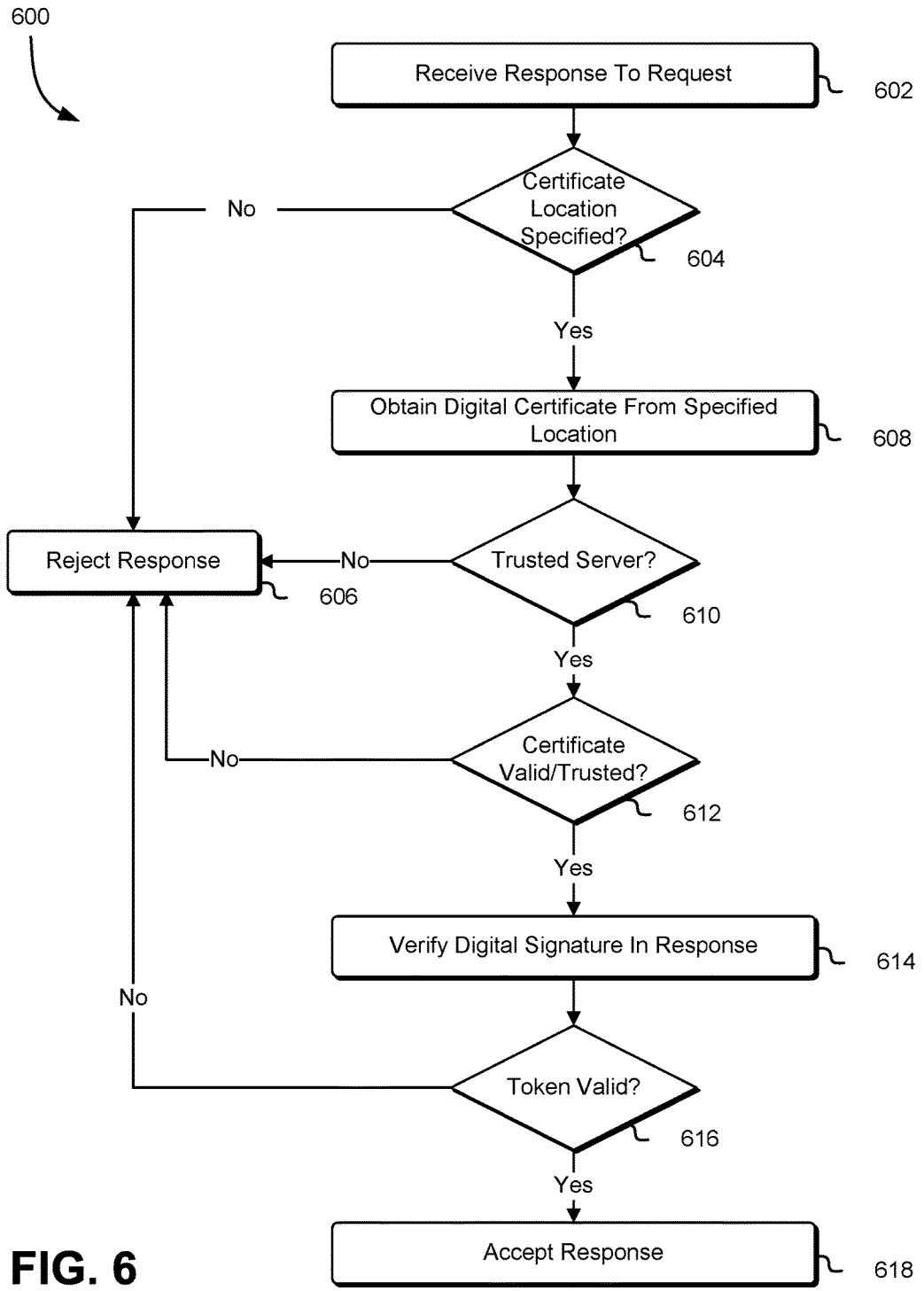
FIG. 6 shows an illustrative example of a process for verifying that the response to a request made to a server is authentic based at least in part on a digital certificate for the server and a digital signature of the server in the response in accordance with at least one embodiment.

As noted above, in response to receiving a JWS token or other response from a response datastore, a client may utilize a digital certificate specified in the JWS token and digitally signed by a trusted certificate authority to determine whether the JWS token or other response originated from a trusted server (e.g., the server that obtained the client request, etc.). This digital certificate may be used to verify the server's digital signature included in the JWS token or other response. Accordingly, FIG. 6 shows an illustrative example of a process 600 for verifying that the response to a request made to a server is authentic based at least in part on a digital certificate for the server and a digital signature of the server in the response in accordance with at least one embodiment. The process 600 may be performed by any client device that obtains a response from a server or a response datastore, which may obtain the response from the server and may provide the response to the client on behalf of the server.

A client may receive 602 a response from a response datastore or server generated by the server in response to a client request. The request may include a JWS token, which may include at least three different components: a header, the payload, and a digital signature. The header may include metadata for the token that may specify the type of digital signature included in the token and the encryption algorithm utilized to generate the digital signature. The server may embed the URI or other location identifier for the digital certificate into the header of the JWS token via an "x5u" parameter within the header of the JWS token. The payload of the JWS token may include the data requested by the client and other information used to identify the server and the token itself. The JWS token may also include a digital signature, which may be generated by combining the encoded header and payload of the JWS token and signing this combination using the destination server's private cryptographic key of the cryptographic key pair. In some instances, the response datastore may provide the response to the client automatically. Alternatively, the response datastore may transmit a notification to the client to indicate that the response is available. In response to the notification, the client may access the response datastore to obtain the response. In some embodiments, the server transmits an acknowledgement to the client to indicate that the response has been stored in the response datastore.

In response to receiving the response to its request, the client may evaluate the response to determine 604 if the response specifies a URI or other location identifier for the location of a digital certificate that can be used to authenticate the response. If the response does not specify the URI or other location identifier for the location of a digital certificate, the client may determine that it cannot authenticate the response and, accordingly, may reject 606 the response. However, if the response specifies a URI or other location identifier for the location of a digital certificate, the client may utilize the URI or other location identifier to obtain 608 the digital certificate from the specified location. For example, the URI or other location identifier may correspond to a location within a certificate datastore that stores the digital certificate. The client may utilize the URI or other location identifier to access the certificate repository and obtain the digital certificate. In some embodiments, the client may cache the digital certificate. Thus, if the client receives a response to requests generated by the server, the client may utilize the digital certificate stored in the cache rather than obtaining the digital certificate from the certificate datastore.

The client may evaluate the digital certificate to determine 610 if the digital certificate specifies, as its subject, a trusted server. In an embodiment, the digital certificate is an X.509 certificate, although other digital certificate encodings are also considered as being within the scope of the present disclosure. The digital certificate may include various fields such as a version, a serial number, an algorithm identifier, an issuer, fields for validity periods, a subject field, fields about the public cryptographic key, issuer unique identifier fields, subject unique identifier fields, extension fields, certificate signature algorithm fields, and a certificate signature field. The client may evaluate the subject field to determine whether it specifies an identifier of a trusted server. The trusted server may include the server to which the client submitted the request or other entity that may be associated with the server and that may have generated the cryptographic key pair on the server's behalf. If the digital certificate does not specify an identifier for a trusted server, the client may determine that the digital certificate does not correspond to a trusted source and, as a result, may reject 606 the response.

If the digital certificate was issued to a trusted server, the client may evaluate the digital certificate to determine 612 if the digital certificate itself is valid and that the issuer of the certificate is a trusted certificate authority (e.g., is a trusted certificate authority, or has a digital certificate that chains in a certificate chain to a trusted certificate authority). For example, the client may evaluate the digital certificate to determine whether it has expired. As described above, the digital certificate may include a field that specifies an expiration date for the digital certificate. If the digital certificate has expired, the client may determine that the digital certificate is not valid for use. Similarly, the digital certificate may include a field that specifies a "not before" date. If the digital certificate specifies a "not before" date that is after the date at which the client has received the digital certificate, the client may determine that the digital certificate cannot be used for authentication, as the digital certificate has not become active for use. In some embodiments, the client obtains, from the certificate authority, a certificate revocation list that specifies the one or more digital certificates that have been revoked by the certificate authority. The client may evaluate the certificate revocation list to determine if the obtained digital certificate is specified in the certificate revocation list. If the digital certificate is specified in the certificate revocation list, the client may determine that the digital certificate has been revoked and is no longer valid. The client may also utilize the certificate authority's public cryptographic key to verify the digital signature specified in the digital certificate originated from the certificate authority. If the client is unable to verify this digital signature, the client may determine that the digital certificate is not valid. If the digital certificate is determined to be invalid, the client may reject 606 the response. In some instances, the client may evaluate the digital certificate to determine whether it was issued by a certificate authority that it is configured to trust or that it otherwise trusts (e.g., because the certificate is in a certificate chain rooted in a trusted certificate authority). For example, if the client is unable to recognize the issuer specified in the digital certificate or the digital certificate was issued by a certificate authority that is not trusted by the client, the client may reject 606 the response.

If the client determines that the digital certificate from the certificate repository is valid, the client may verify 614 that the digital signature specified in the JWS token or other response is present and determine 616 whether the JWS token is valid. For instance, the client may obtain the server's public cryptographic key from the digital certificate and utilize this public cryptographic key to determine if the digital signature, which may be created using the server's private cryptographic key, is valid. Additionally, the client may evaluate the JWS token to determine whether it has expired or if the JWS token has been activated for use. Further, the client may determine whether the JWS token was generated by the trusted server or other entity that the client is configured to trust. If the client determines that the JWS token provided is not valid, the client may reject 606 the response. However, if the JWS token is valid, the client may accept 618 the response from the server and obtain the requested data.

In some embodiments, the client evaluates the JWS token to determine whether the algorithm utilized to generate the digital signature satisfies one or more criteria for acceptance of the response. For instance, in order for the client to accept the response, the JWS token may need to be digitally signed using an algorithm that would prevent unauthorized modification of the digital signature or enable other entities to forge the digital signature. The client may require that a particular algorithm be utilized to generate the digital signature and may evaluate the JWS token to determine whether said algorithm or other algorithm that provides the same or better level of security is specified in the JWS token. If the JWS token does not specify such an algorithm in the header, the client may reject the response.

It should be noted that the operations of the process 600 may be performed in a different order. For instance, the client may determine whether the digital certificate is valid prior to determining whether the digital certificate originated from a trusted server. Thus, if the client determines that the digital certificate is not valid, the client may reject the response without determining whether the digital certificate specifies an identifier of a trusted server.

Figure 7:
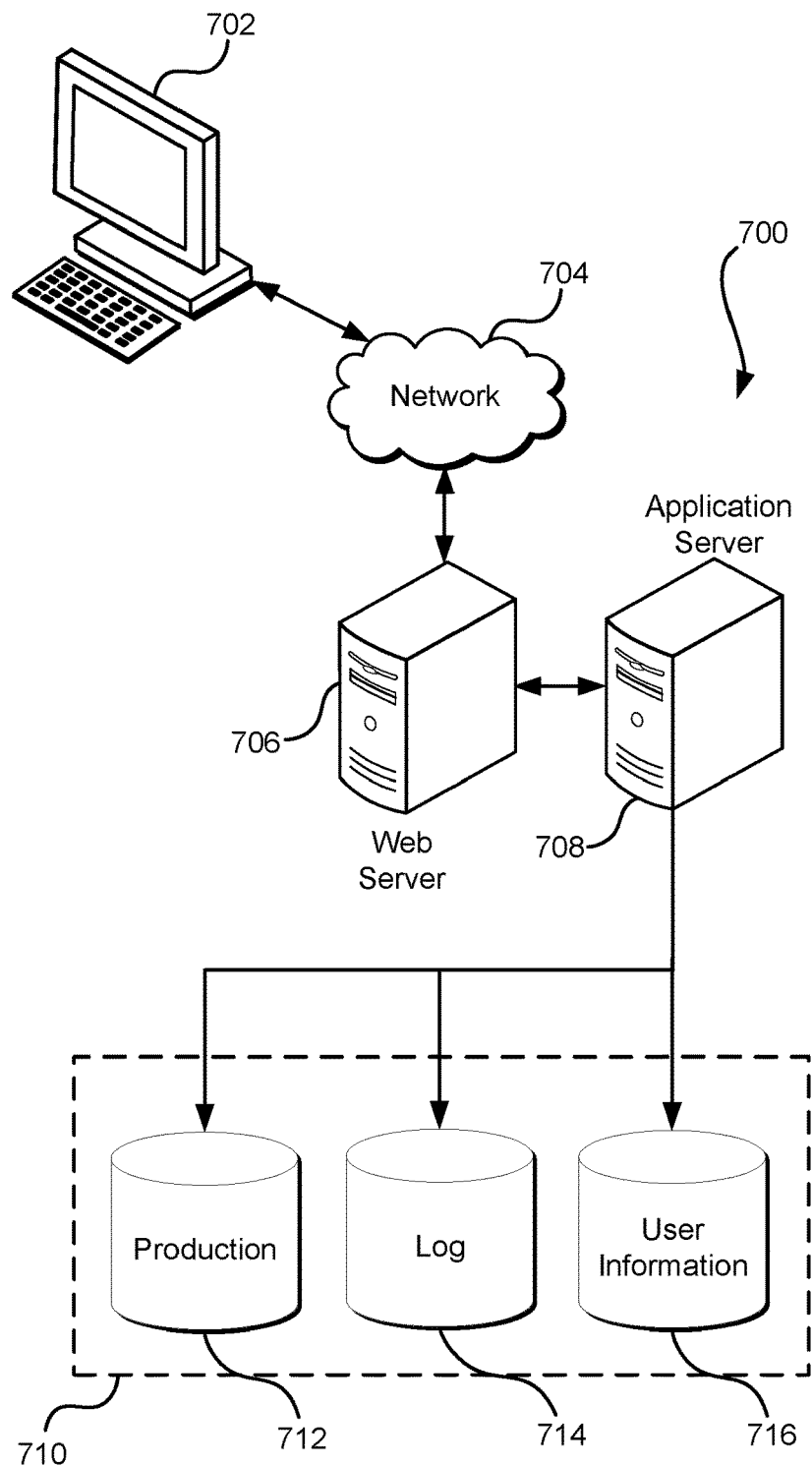
FIG. 7 shows an illustrative example of an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a datastore 710. It should be understood that there can be several application servers, layers, or other elements, processes, or components, which may be chained or otherwise configured, which can interact to perform tasks such as obtaining data from an appropriate datastore. Servers, as used herein, may be implemented in various ways, such as hardware devices or virtual computer systems. In some contexts, servers may refer to a programming module being executed on a computer system. As used herein, unless otherwise stated or clear from context, the term "datastore" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the datastore as needed to execute aspects of one or more applications for the client device, handling some or all of the data access and business logic for an application. The application server may provide access control services in cooperation with the datastore and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The datastore 710 can include several separate data tables, databases, data documents, dynamic data storage schemes, and/or other data storage mechanisms and media for storing data relating to a particular aspect of the present disclosure. For example, the datastore illustrated may include mechanisms for storing production data 712 and user information 716, which can be used to serve content for the production side. The datastore also is shown to include a mechanism for storing log data 714, which can be used for reporting, analysis, or other such purposes. It should be understood that there can be many other aspects that may need to be stored in the datastore, such as page image information and access rights information, which can be stored in any of the above listed mechanisms as appropriate or in additional mechanisms in the datastore 710. The datastore 710 is operable, through logic associated therewith, to receive instructions from the application server 708 and obtain, update, or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the datastore might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of datastores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, from a client device, a request;
   initiating an asynchronous process to fulfill the request;
   at a time after receipt of the request, causing a certificate authority to issue a digital certificate that encodes a public cryptographic key, the public cryptographic key corresponding to a private cryptographic key;
   storing the digital certificate in a datastore;
   obtaining response data for the request that results from the asynchronous process;
   using the private cryptographic key to digitally sign the response data to result in a digital signature of the response data;
   generating a token that encodes the response data, the digital signature, and a link to the digital certificate that enables the client device to obtain the digital certificate from the datastore; and
   providing the token to the client device.

2. The computer-implemented method of claim 1, further comprising generating, in response to the request, a cryptographic key pair that includes the public cryptographic key and the private cryptographic key.

3. The computer-implemented method of claim 1, wherein providing the token to the client device includes transmitting the the token to a service to cause the service to provide the the token to the client device.

4. The computer-implemented method of claim 1, wherein the token is a JavaScript Object Notation Web Signature token.

5. A system, comprising at least one computing device configured to implement one or more services, wherein the one or more services:
   receive, from a client device, a request;
   initiate an asynchronous process to fulfill the request;
   at a time after receipt of the request, cause a certificate authority to issue a digital certificate that encodes a public cryptographic key, the public cryptographic key corresponding to a private cryptographic key;
   store the digital certificate in a location from which the digital certificate is obtainable;
   obtain response data for the request that results from the asynchronous process;
   generate, using the private cryptographic key, a digital signature for the response data, the digital signature verifiable using a digital certificate;
   generate a token that encodes the response data, the digital signature, and location information that indicates the location; and
   make available the token.

6. The system of claim 5, wherein the one or more services further:
   determine, at a time after making available the token, that the digital certificate has been revoked;
   generate a second digital signature for the response data, the second digital signature verifiable using a second digital certificate; and
   make available the response data, the second digital signature, and second location information that indicates a second location which the second digital certificate is obtainable.

7. The system of claim 5, wherein the one or more services further
   generate, in response to the request, a cryptographic key pair that includes the public cryptographic key and the private cryptographic key.

8. The system of claim 5, wherein the one or more services further provide the token to another service to make available the token.

9. The system of claim 5, wherein the location information is a Uniform Resource Identifier corresponding to a datastore in which the digital certificate is stored.

10. The system of claim 5, wherein the token is a JavaScript Object Notation Web Signature token.

11. The system of claim 5, wherein the one or more services further:
    at a time after making available the token, determine that the public cryptographic key has been compromised;
    receive a second request to provide a revocation status for the public cryptographic key; and
    in response to the second request, provide a notification specifying that the public cryptographic key has been revoked such that the public cryptographic key cannot be used to verify the digital signature.

12. The system of claim 5, wherein the one or more services further obtain, from the certificate authority, the location information that indicates the location from which the digital certificate is obtainable.

13. A non-transitory computer-readable storage medium having stored thereon executable instructions that, as a result of being executed by one or more processors of a computer system, cause the computer system to at least:
    receive a request;
    initiate an asynchronous process to fulfill the request;
    at a time after receipt of the request, cause a certificate authority to issue a digital certificate that encodes a public cryptographic key, the public cryptographic key corresponding to a private cryptographic key;
    store the digital certificate in a location from which the digital certificate is obtainable;
    obtain response data for the asynchronous response to the request;
    use the private cryptographic key to digitally sign the response data, resulting in a digital signature of the response data;
    generate a token that encodes the response data, the digital signature, and location information that indicates the location; and
    make available the token.

14. The non-transitory computer-readable storage medium of claim 13, wherein the instructions further cause the computer system to
    obtain, in response to the request, a cryptographic key pair that includes the public cryptographic key and the private cryptographic key.

15. The non-transitory computer-readable storage medium of claim 13, wherein the instructions that cause the computer system to make available the token further cause the computer system to transmit the token to a requestor.

16. The non-transitory computer-readable storage medium of claim 13, wherein the instructions further cause the computer system to:
   at a time after making available the token, determine that the public cryptographic key has become invalid;
   identify a second location from which a second public cryptographic key usable to verify the digital signature is obtainable; and
   make available second location information that indicates the second location.

17. The non-transitory computer-readable storage medium of claim 13, wherein the location information comprises a Uniform Resource Identifier usable to request the public cryptographic key.

18. The non-transitory computer-readable storage medium of claim 13, wherein the instructions further cause the computer system to:
   at a time after making available the token, determine that the public cryptographic key has been compromised;
   receive a request to provide a revocation status for the public cryptographic key; and
   in response to the request, provide a notification specifying that the public cryptographic key has been revoked such that the public cryptographic key cannot be used to verify the digital signature.

19. The non-transitory computer-readable storage medium of claim 13, wherein the token is a JavaScript Object Notation Web Signature token.

20. The non-transitory computer-readable storage medium of claim 13, wherein the instructions further cause the computer system to obtain, from the certificate authority, the location information that indicates the location from which the digital certificate is obtainable.

* * * * *